April 22, 1924.
A. J. CAWLEY
1,491,256
PROCESS OF PRODUCING SOUND RECORDS
Filed May 2, 1917
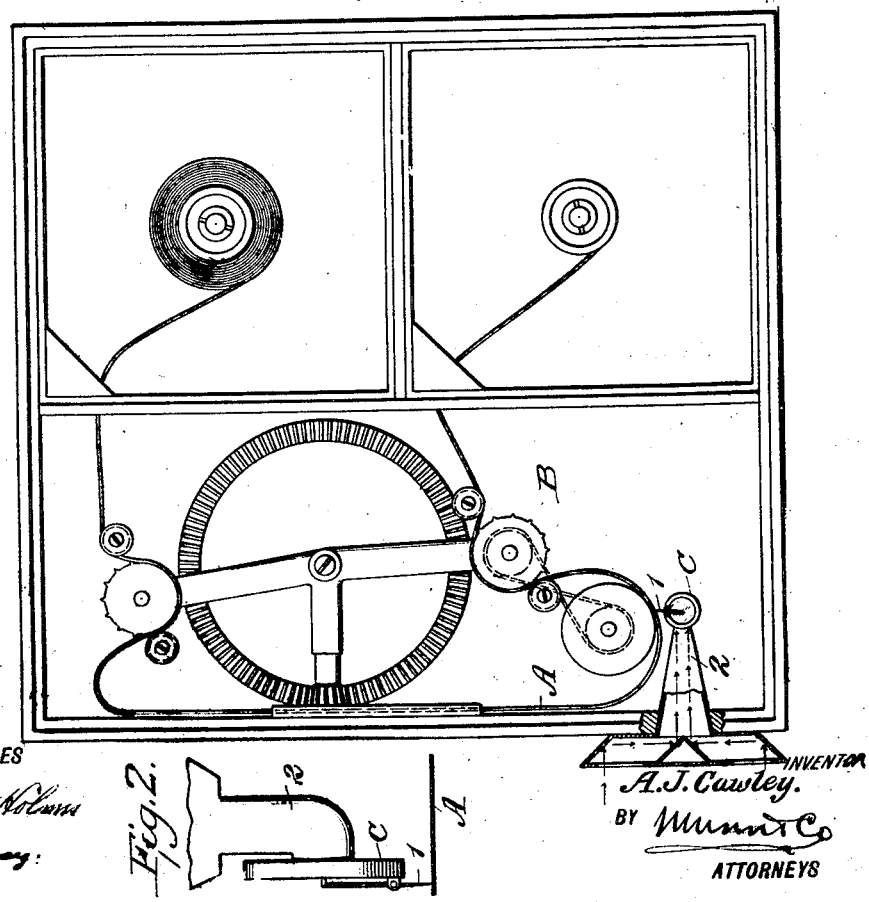

Patented Apr. 22, 1924.

1,491,256

UNITED STATES PATENT OFFICE.

ALOYSIUS J. CAWLEY, OF PITTSTON, PENNSYLVANIA.

PROCESS OF PRODUCING SOUND RECORDS.

Application filed May 2, 1917. Serial No. 165,861.

*To all whom it may concern:*

Be it known that I, ALOYSIUS J. CAWLEY, a citizen of the United States, and a resident of the city of Pittston, in the county of Luzerne and State of Pennsylvania, have invented a new and Improved Process of Producing Sound Records, of which the following is a full, clear, and exact description.

The invention relates to the method of producing sound records on celluloid films, as for instance moving picture films, so that talking pictures can be produced, although it is not necessarily limited to this field.

The invention has for its general objects the provision of an improved method of making records accurately, expeditiously and economically, and at the same time insure absolute synchronism between the pictures and the accompanying sounds.

In carrying out the process, the suitable portion of the moving picture film is utilized for the recording of the sound. The film passes under a stylus which is in non-cutting contact with it, whereby chemical action is produced so that when the film is developed, a line of metallic silver will be formed where the stylus has come in contact with the record.

This film is developed, and a reproducing record or film is obtained, which has therein a sound record groove which can be used in connection with a phonographic reproducer to recreate the original sounds.

For a more complete understanding of the invention, reference is to be had to the following description and claim taken in connection with the accompanying drawings, which illustrate certain embodiments of the invention and wherein similar reference characters are employed to designate corresponding parts.

Figure 1 is an interior view of a moving picture camera showing the sound recording means in connection with the film thereof.

Figure 2 is a detail view of the sound recorder on the camera.

The film A, as it passes through a motion picture camera B, is in contact with a stylus, or recording point 1 of a sound recorder C, preferably of the lateral cut type, as this type of sound recording is specially adapted to this purpose. Although the film may not be abrased or marked in any manner, still when it is developed, it will be found that the silver haloid of the film has been reduced to metallic silver wherever the stylus has come in contact with the film. A dark line of metallic silver will thus be produced.

The sounds are to be received at the camera, the stylus being attached directly to a diaphragm on which the sounds impinge.

If the metallic silver sound record obtained as described above is found to be too faint, it can be intensified in any ordinary manner, such as by means of mercuric chloride.

It is desirable that the film in the camera be driven by a constant speed motor in order to obtain the proper recording of sounds.

Having thus described my invention, I claim as new and desire to secure by Letters Patent,

In the herein described process of making sound records, consisting in vibrating a stylus in uncutting contact with a photosensitive medium to chemically alter the same along the line of contact and developing the said medium.

Pittston, Pa., July 7th, 1922.

ALOYSIUS J. CAWLEY.